United States Patent [19]

Shin et al.

[11] Patent Number: 5,633,989
[45] Date of Patent: May 27, 1997

[54] ARTIFICIAL NEURAL CIRCUIT USING PULSE CODING

[75] Inventors: Jong-Han Shin; Jong-Geon Shin, both of Seoul, Rep. of Korea

[73] Assignee: Electronics and Telecommunications Research Institute, Daejeon-Shi, Rep. of Korea

[21] Appl. No.: 298,286

[22] Filed: Aug. 31, 1994

[30] Foreign Application Priority Data

Aug. 31, 1993 [KR] Rep. of Korea ............ 93-17280

[51] Int. Cl.$^6$ ............................................. G06F 15/18
[52] U.S. Cl. ........................................ 395/24; 395/27
[58] Field of Search ................................ 395/24, 27

[56] References Cited

U.S. PATENT DOCUMENTS

| | | | |
|---|---|---|---|
| 4,807,168 | 2/1989 | Moopenn et al. | 395/27 |
| 4,950,917 | 8/1990 | Holler et al. | 395/27 |
| 5,043,913 | 8/1991 | Furutani | 395/27 |
| 5,129,042 | 7/1992 | Jeong | 395/27 |
| 5,206,541 | 4/1993 | Boahen et al. | 395/24 |
| 5,212,766 | 5/1993 | Arima | 395/23 |
| 5,299,286 | 3/1994 | Imondi et al. | 395/27 |
| 5,329,610 | 7/1994 | Castro | 395/24 |
| 5,331,215 | 7/1994 | Allen et al. | 395/24 |
| 5,341,051 | 8/1994 | Kirk | 395/24 |
| 5,343,555 | 8/1994 | Yayla et al. | 395/24 |
| 5,353,382 | 10/1994 | Yariv et al. | 395/24 |
| 5,381,515 | 1/1995 | Platt et al. | 395/27 |
| 5,394,511 | 2/1995 | Mashiko | 395/27 |
| 5,412,565 | 5/1995 | Boser et al. | 395/27 |
| 5,448,682 | 9/1995 | Chung et al. | 395/27 |
| 5,450,528 | 9/1995 | Chung et al. | 395/27 |

OTHER PUBLICATIONS

Cauwenberghs et al, "An Adaptive CMOS Matrix–Vector Multiplier for Large Scale Analog Hardware Neural Network Applications", Inter. Conf. on Neural Networks, IEEE 1991.

Lanser et al, "An Analog CMOS Chip Set for Neural Networks with Arbitrary Topologies", IEEE Transactions on Neural Networks, 1993.

Chen et al, "VLSI Circuits for Optoelectronic Neural Network Weight Setting", Midwest Symposium on Circuits and Systems, IEEE 1993.

Morishita, "A BiCMOS Analog Neural Network with Dynamically Updated Weights", 37th Conference (ISSCC) on Solid–State Circuits, IEEE 1990.

Tomlinson Jr., Max S. et al.; "A Digital Neural Network Architecture for VLSI", pp. II/545–II/550; Neural Semiconductor, Inc., Carlsbad, CA.

*Primary Examiner*—George B. Davis
*Attorney, Agent, or Firm*—Larson and Taylor

[57] ABSTRACT

Disclosed is an artificial neural circuit using a pulse coding such as a stochastic pulse coding or a noise feedback pulse coding, the circuit comprising a synapse circuit section for producing and absorbing a current signal proportional to a weight voltage signal upon an externally applied current signal being supplied; a neuron body circuit section for spacio-temporally integrating output signal of the synapse circuit section to produce an analog voltage signal; and an axon hillock circuit for converting the analog voltage signal into a pulse train using a predetermined reference signal. The synapse circuit section including a first input terminal for receiving a first reference voltage; a second input terminal for receiving a second reference voltage; a third input terminal for receiving a third reference voltage; a fourth terminal for receiving the weight voltage signal; a first transistor having drain and source connected to the first reference voltage and a junction point, respectively, and gate connected to the fourth input terminal; a second transistor having drain and source connected to the junction point and the second input terminal, respectively, and gate connected to the third input terminal; and a third transistor having drain and source connected respectively to the junction point and an output terminal of the synapse circuit section, and gate connected to an input terminal for receiving the externally applied current signal.

4 Claims, 6 Drawing Sheets

ARTIFICIAL NEURAL CIRCUIT USING PULSE CODING

BACKGROUND OF THE INVENTION

1. Field of the Invention

The present invention relates to an artificial neural circuit apparatus based on a pulse coding such as a stochastic pulse coding (hereinafter, referred to as "SPC") or a noise feedback pulse coding (hereinafter, referred to as "NFPC").

2. Description of the Prior Art

Among the electronic neural circuits disclosed so far, pulse coding neural circuits have received a great deal of attention in recent years because of their analogy with biological neurons and the effectiveness of weight computation. However, the pulse coding approaches require more computation time for the weighted summation than other approaches.

An elementary nerve cell, called a neuron, is the basic building block of a biological neural network.

FIG. 1 shows a schematic diagram of a typical neuron, which consists of three main parts: a plurality of dendrites 1, a neuron body 2, and a axon hillock 3. The dendrites 1 aggregate synaptic input from other neurons. In detail, the dendrites 1 functionate as input portions, respectively, and are connected with other neurons to receive information from the other neurons. The information indicate input currents which are respectively received through the dendrites 1. The input currents received thus are spacio-temporally integrated by capacitance of the neuron body 2, so that an analog signal, particularly an analog voltage, may be produced in the neuron body 2. The analog signal produced thus is encoded in the initial segment of the axon hillock 3 and converted into a pulse sequence (or a pulse train). At this time, the converted pulse train is propagated to an axon which ends in synaptic contacts to dendrites of other neurons. Synapses 4 in one neuron function as central-information processing elements in neural systems, and control a flow of a current to be applied to a membrane connected therewith.

In recent years, an electric neural circuit has been proposed as a novel information processing device possible to perform similar operation to that of a biological neuron, as described above. The conventional electric neural circuit has used an SPC method so as to convert an analog voltage or a binary digital value into a pulse train. However, in the SPC method, there is a problem that a large number of pulses are required for performing the SPC method and a plurality of random pulse generator possible to operate independently with each other is required in order that concise conversion of the analog voltage into the pulse train can be achieved.

SUMMARY OF THE INVENTION

It is an object of the present invention to provide an artificial neural circuit apparatus utilizing an stochastic pulse coding or an noise feedback pulse coding so as to overcome the above-mentioned problem.

It is another object of the present invention to provide an artificial neural circuit apparatus having an analog-digital mixed neural circuit so as to overcome the above-mentioned problem.

According to the aspect of the present invention, the artificial neural circuit in which an operating principal of a biological neuron is embodied, said circuit comprising a synapse circuit section for producing and absorbing a current signal proportional to a weight voltage signal upon an externally applied current signal being supplied; a neuron body circuit section for spacio-temporally integrating output signal of the synapse circuit section to produce an analog voltage signal; and an axon hillock circuit for converting the analog voltage signal into a pulse train using a predetermined reference signal.

In this embodiment, said synapse circuit section including a first input terminal for receiving a first reference voltage; a second input terminal for receiving a second reference voltage; a third input terminal for receiving a third reference voltage; a fourth terminal for receiving the weight voltage signal; a first transistor having drain and source connected to the first reference voltage and a junction point, respectively, and gate connected to the fourth input terminal; a second transistor having drain and source connected to the junction point and the second input terminal, respectively, and gate connected to the third input terminal; and a third transistor having drain and source connected respectively to the junction point and an output terminal of the synapse circuit section, and gate connected to an input terminal for receiving the externally applied current signal.

In this embodiment, said axon hillock circuit comprises a random wave generator for generating the predetermined reference signal, a first comparator for comparing the predetermined reference signal with an output signal of the neuron body circuit section, and an AND gate for receiving an output signal of the first comparator and a predetermined frequency signal, so as to generate the pulse train having one half of duty ratio of the output signal of the first comparator.

In this embodiment, said axon hillock circuit section comprises integrating means for integrating the output signal of the neuron body circuit section to produce an integrated signal, a second comparator for comparing the integrated signal with a threshold signal to produce a resulting signal, duty converting means for generating an output signal having one half of duty ratio of the resulting signal of the second comparator, and feedback means in response to the output signal of the duty converting means to supply a reference signal for the integrating means.

In this embodiment, said neuron body circuit section comprises an operational amplifier having an inverting terminal connected with the source of the second transistor and a non-inverting terminal connected with a ground, a capacitor connected between the inverting terminal and an output terminal Of the operational amplifier, and a resistor connected in parallel to the capacitor, so that integration time of the neuron body circuit section is controlled dependent upon time constant of the capacitor and resistor.

BRIEF DESCRIPTION OF THE DRAWINGS

This invention may be better understood and its object and advantage will become apparent to those skilled in the art by reference to the accompanying drawings as follows.

DESCRIPTION OF THE PREFERRED EMBODIMENT(S)

Figure 1:
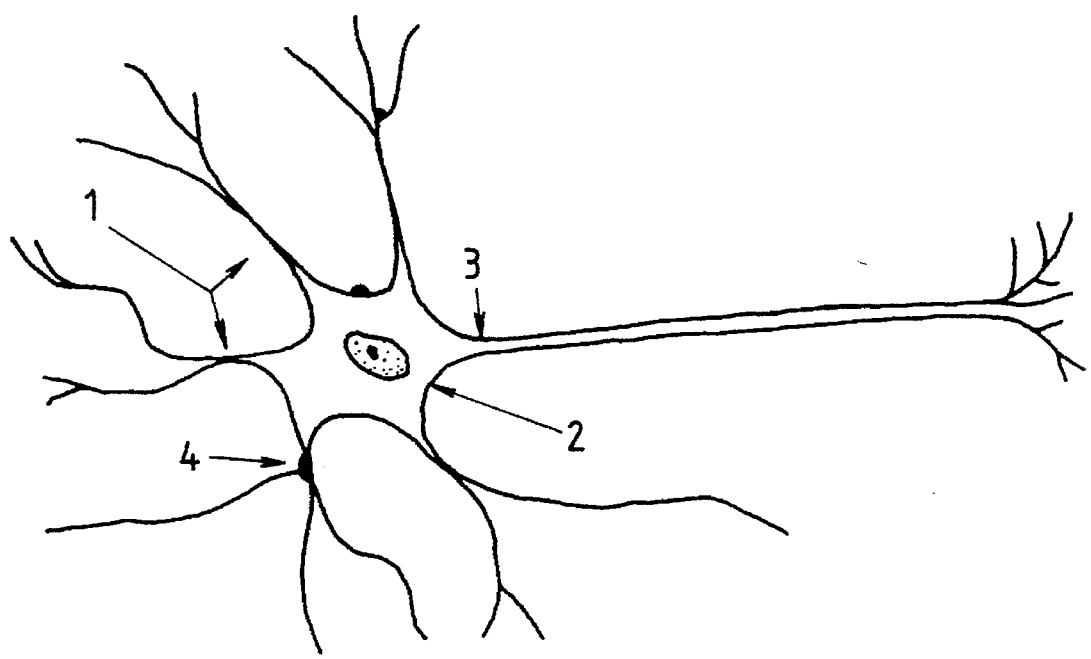
FIG. 1 is a schematic diagram showing configuration of a typical biological neuron.
Figure 2:
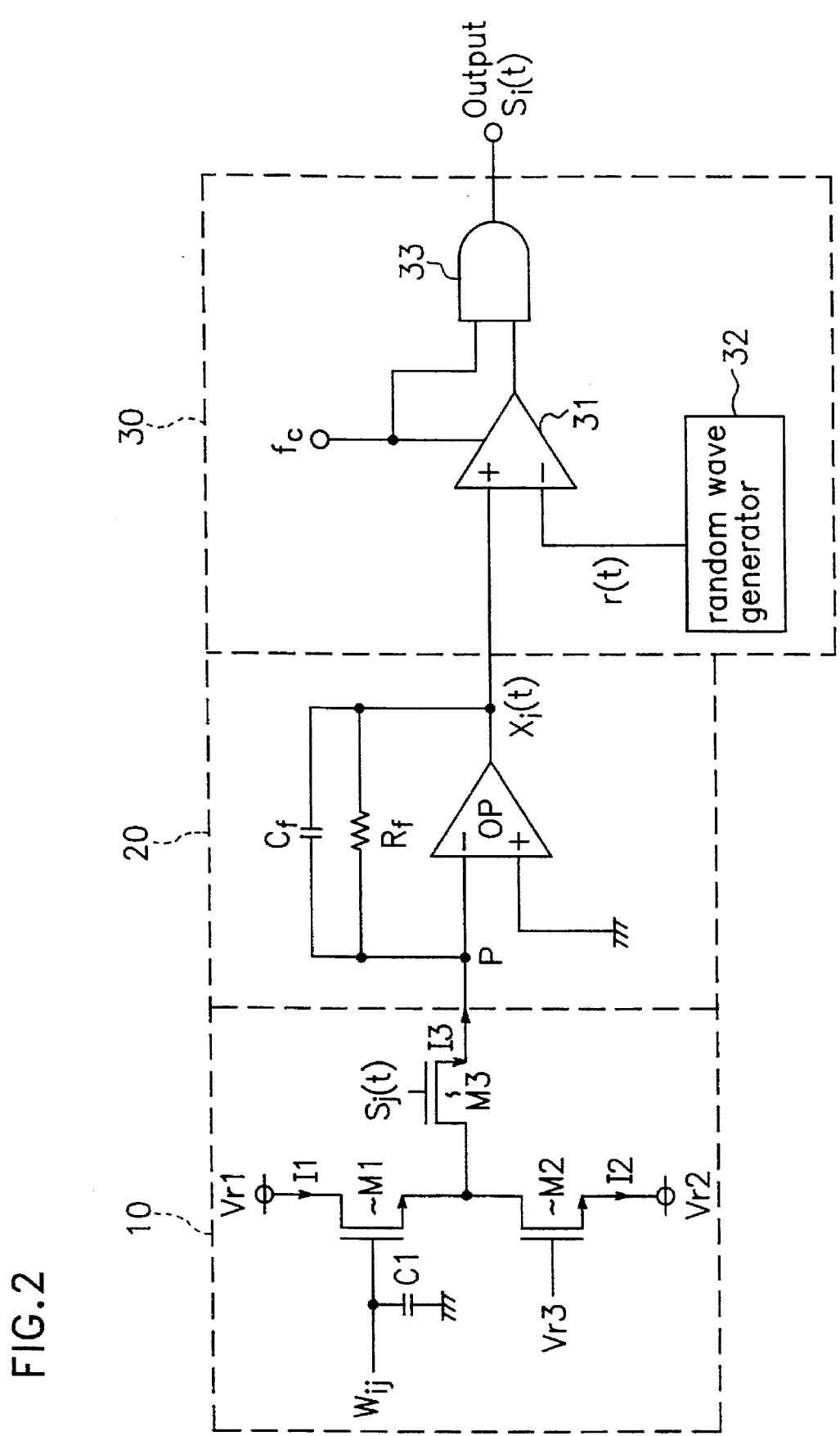
FIG. 2 is a circuit diagram of an artificial neural circuit according to an embodiment of the present invention.

Referring now to FIG. 2, the artificial neural circuit using a stochastic pulse coding in accordance with one embodiment of the present invention has three circuit sections, a synapse circuit section 10, a neuron body circuit section 20 and an axon hillock circuit section 30. In this embodiment, the synapse circuit section 10 is modelled by the combination of three NMOS transistors M1, M2 and M3.

In the synapse circuit section 10 shown in FIG. 2, a first reference voltage Vr1 is applied to the drain of the transistor M1, and a second reference voltage Vr2 is applied to the source of the transistor M2. The source of the transistor M1 is connected to the drains of the transistor M2 and M3. Also, a third reference voltage Vr3 is applied to the gate of the transistor M2 and an weight voltage signal $W_{ij}$ is applied to the gate of the transistor M1 through a connection point, which is connected to a ground through a capacitor C1 for eliminating a noise in the weight voltage signal $W_{ij}$. An input signal $S_j(t)$ from another neural circuit is applied to the gate of the transistor M3 which has the source to be connected with the input terminal of the neuron body circuit section 20. Particularly, the transistors M1 and M2 in the synapse circuit section 10 are biased in the linear region.

The synapse circuit section 10 formed thus produces or absorbs a current proportional to the weight voltage signal $W_{ij}$, when the input signal $S_j(t)$ as a pulse signal is applied to the gate of the transistor M3 through another neural circuit.

At this time, a current signal from the source of the synapse circuit section 10 is applied to the input of the neuron body circuit section 20. The neuron body circuit section 20 comprises an operational amplifier OP having an inverting input terminal as the input of the neuron body circuit section 20 and a non-inverting input terminal connected with a ground, a resistor $R_f$ and a capacitor $C_f$ each connected between the inverting input terminal and the output terminal of the amplifier OP. By the neuron body circuit section, the current signals from the synapse circuit section 10 are integrated over accumulation time, and hence the multiplication of signal $S_j(t)$ by $W_{ij}$ is generated therefrom.

Finally, the axon hillock circuit section 30 is modelled by a comparator 31 having two input terminals, one of which is a non-inverting terminal to be connected with the output of the neuron body circuit section 20, and the other of which is an inverting terminal to be connected to the output of the random waveform generator 32. The axon hillock circuit section 30 further comprises an AND gate 33 for receiving output signal from the comparator 31 and a clock signal $f_c$ of a predetermined frequency so as to generate the pulse train having one half of duty ratio of the output signal of the comparator 31.

In the synapse circuit section 10, the output current $I_3$ is given by:

$$I_3 = I_1 - I_2 = u\, C_{ox} \left[ \frac{W_1}{L_1} (V_{GS1} - V_T) V_{DS1} - \frac{W_1}{L_1} \frac{V_{DS1}^2}{2} - \frac{W_2}{L_2} (V_{GS2} - V_T) V_{DS2} + \frac{W_2}{L_2} \frac{V_{DS2}^2}{2} \right] \quad (1)$$

wherein $I_1$ is an input current flowing from the Vr1 terminal to the drain of the transistor M1, $I_2$ is an output current flowing from the source of the transistor M2 to the Vr2 terminal, u is the carrier mobility, $C_{ox}$ is the oxide capacitance per unit area, W is the channel width, and L is the channel length. $V_{GS}$, $V_T$ and $V_{DS}$ are gate-source, threshold and drain-source voltages, respectively, and subscripts 1 and 2 refer to the transistors M1 and M2, respectively.

Assume that M1 and M2 are a matched pair in the synapse circuit section 10, and Vr1=Vr2. Then, when the transistor M3 is turned on, the junction point of M1, M2 and M3 is virtually grounded, and hence $V_{DS1}=V_{DS2}$. Therefore, from the expression (1), expression (2) is given as follows:

$$I_3 = \begin{cases} u \cdot C_{ox} \cdot \frac{W_1}{L_1} \cdot (V_{GS1} - V_{GS2}) \cdot V_{DS1}, & \text{for } M3 \text{ on} \\ 0, & \text{for } M3 \text{ off} \end{cases} \quad (2)$$

In the expression (2), $I_3$ is controlled by $V_{GS1}$ which represents the synaptic weight; in other words, the synapse circuit section 10 serves as an excitatory synapse when $V_{GS1} < V_{GS2}$ and as an inhibitory synapse when $V_{GS1} > V_{GS2}$. The neural body circuit section 20 serving as a current integrator performs spacio-temporal summation of synaptic currents. If the operational amplifier OP therein has a high gain, then the output voltage $x_i(t)$ must satisfy the following equation:

$$\tau \frac{dx_i(t)}{dt} = -x_i(t) + \sum_j W_{ij} S_j(t), \quad \tau = R_f \cdot C_f \quad (3)$$

Figure 3:
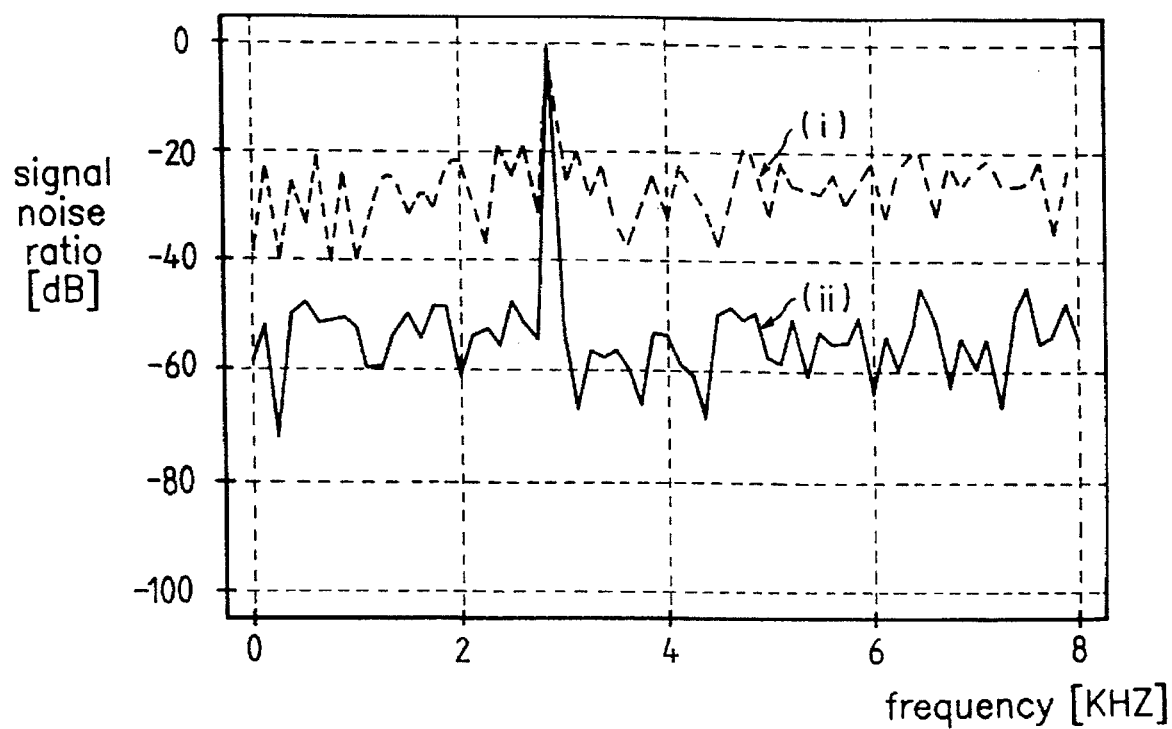
FIG. 3 is a diagram showing waveforms of a pulse train signal to be supplied from the output terminal of the axon hillock circuit section shown in FIG. 2, in case that a testing sinusoid signal is applied to the input terminal of the axon hillock circuit section.

In order to evaluate the linearity of the synapse circuit section 10, the total harmonic distortion (THD) of the output current $I_3$ was computed under the conditions: $W_1/L_1 = 10$ μm, Vr1=−Vr2=+1 [V], Vr3=2 [V], 2 [V]$\leq W_{ij} \leq$4 [V], and $S_j$ is high. The result is shown in FIG. 3. It is understood that the THD is less than 48 dB, which implies 8-bit resolution for peak-to-peak input signal $W_{ij}$ of 2 [V].

As seen from the above description, the axon hillock circuit section 30 in FIG. 2 converts the analog voltage $x_i(t)$ from the neuron body circuit section 20 to a pulse sequence $s_i(t)$. If the output r(t) of the random waveform generator has a uniform probability density distribution over the same full scale amplitude range as that of the analog voltage $x_i(t)$, then the output $s_i(t)$ of the axon hillock circuit section is given as follows:

$$s_i(t) = \begin{cases} 1, & \text{if } x_i(t) > r(t) \\ 0, & \text{if } x_i(t) < r(t) \end{cases} \quad (4)$$

Therefore, the probability $P\{s_i(t)=1\}$ represents the coded value of the analog neuron state voltage $x_i(t)$ which can be transmitted and/or processed as a stochastic pulse sequence. Obviously, the output pulse sequence is very insensitive to interfering pulses as long as they are sufficiently small in number. Ideally, integration of the output $s_i(t)$ over a given time interval should be the same interval. Practically, the error between the two quantities has a variance as given by the following equation (5).

$$\sigma\left(\frac{X}{S}\right) = \left(\frac{1-P}{P} \cdot \frac{t_c}{T}\right)^{\frac{1}{2}} \quad (5)$$

where S is the integration of the sampled pulse sequence $s_i(t)$ over a given accumulation time interval T, X is the actual mean of the neuron body voltage $x_i(t)$ over the time interval T, $t_c$ is the clock period, and hence $T \cdot P/t_c$ is the average number of pulses during the time interval T. Equation (5) represents noise contained in the pulse sequence which originates from the stochastic pulse coding. This noise depends on the time interval T and the clock frequency, $f_c(=1/t_c)$, used in the stochastic pulse coding. Since the coding noise decreases with the number of pulses over the time interval T, the noise effect can be reduced by choosing a long time interval, which is determined by the time constant of the neuron body circuit section 20.

The neural circuit of FIG. 2 has a sigmoidal function due to the nonlinear characteristics of the neuron body circuit section 20 and the coding characteristics of the axon hillock circuit section 30.

Figure 4:
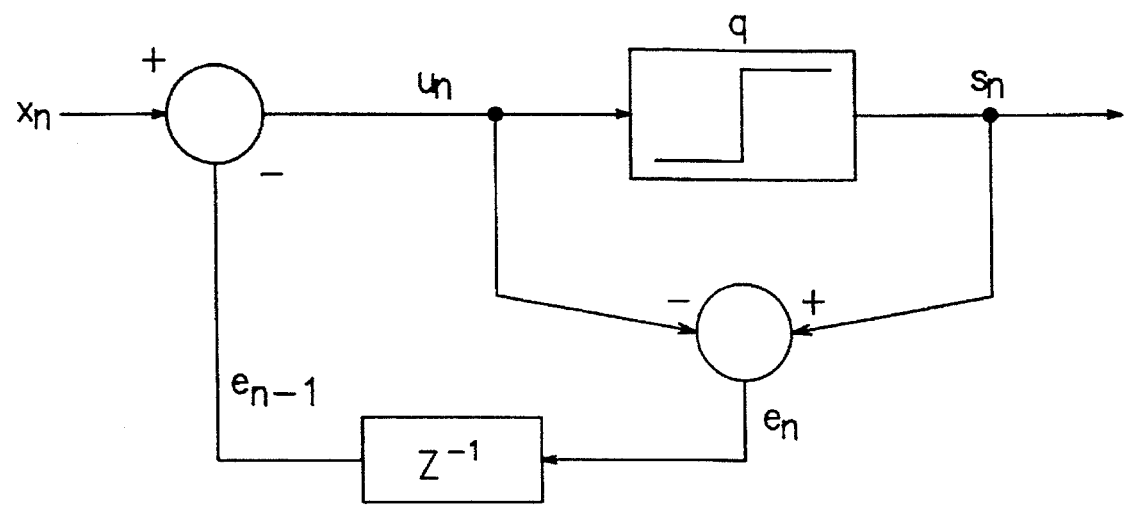
FIG. 4 is a block diagram showing a noise feedback pulse coding to be used in another embodiment of the present invention.

In order to evaluate the efficiency of the axon hillock circuit section 30 using stochastic pulse coding in terms of a number of pulses used in coding over a given T and signal noise ratio (hereinafter, referred to as "SNR") as coding noise, simulation was performed by applying a test sinusoid to the axon hillock circuit section 30 and by analyzing the output pulse sequence. The test conditions were: accumulation time=0.125 ms, test input signal=2875 Hz sinusoid with ±0.5 V range, clock frequency=512 kHz, output range of the random waveform generator=±1 V. Under these conditions, the output pulse sequence had a length of 64 pulses (0.125 ms×512 kHz) and the resulting SNR, as shown in FIG. 3(i), is about 18 dB, which corresponds to 3-bit resolution. Another simulation was performed with a clock frequency changed to 262 MHz. At this time, the output pulse sequence had a length of 215 pulses (0.125 ms× 262 MHz) and the resulting SNR, as shown in FIG. 4(ii), is 45 dB, or 7–8 bit resolution, which is adequate for most neural network algorithms. These simulation results confirm the implication of (5), i.e. the coding noise decreases as the clock frequency and the accumulation time increase.

On the other hand, NFPC is a noise reduction technique which feeds back the coding noise and subtracts it from the next input. The block diagram of this technique is shown in FIG. 4. The system input $x_n[-1,1]$ and bilevel output $s_n$ are related by the following nonlinear recursive equation:

$$u_n = X_n - e_{n-1} \quad (6)$$

$$s_n = q(u_n) \quad (7)$$

$$e_n = s_n - u_n \quad (8)$$

The corrected value $u_n$ is quantized to $s_n$ by the nonlinear sign function q; thus $s_n = \pm 1$ depending on whether or not $u_n$ is positive. The quantizer error $e_n(=q(u_n)-u_n)$ influences future quantization decisions. In other words, it will be subtracted from the actual input value of the next sample to create a new corrected value, which will in turn be quantized to generate a new output and a new quantizer error, and so on. From the equations (6) and (8), following equations (9) and (10) can be obtained.

$$e_n - e_{n-1} = s_n - x_n \quad (9)$$

$$u_n = (x_n - s_{n-1} \quad (10)$$

Taking the z-transform of both sides of equation (9), the coding noise transform is obtained as follows:

$$E(z) = \frac{S(z) - X(z)}{1 - Z^{-1}} \quad (11)$$

where E(z)=z-transform of $e_n$, etc. Equation (11) suggests that the coding noise decreases in the low frequency region due to high pass filtering. In the high frequency region the coding noise is removed by low pass filtering of the neuron body circuit section. Therefore, a greater SNR than stochastic pulse coding is obtained with this method under the same coding condition. In other words, NFPC needs far fewer pulses than SPC for the same SNR. To confirm the above statement, the performance of NFPC was simulated under the same conditions as assumed to obtain FIG. 3(i). The result is plotted in FIG. 7, which shows an SNR of about 45 dB, or 7–8-bit resolution. Therefore, to obtain a coded pulse sequence of about 45 dB, SPC needs a length of 212 pulses, whereas NFPC needs a length of 26 pulses. In other words, if the same clock frequency is used, the accumulation time in the NFPC neural circuit section can be reduced, as compared with the SPC neural circuit section, and the first neural circuit is 513 times faster than the second neural circuit in computation of weighted summation and communication.

Figure 5:
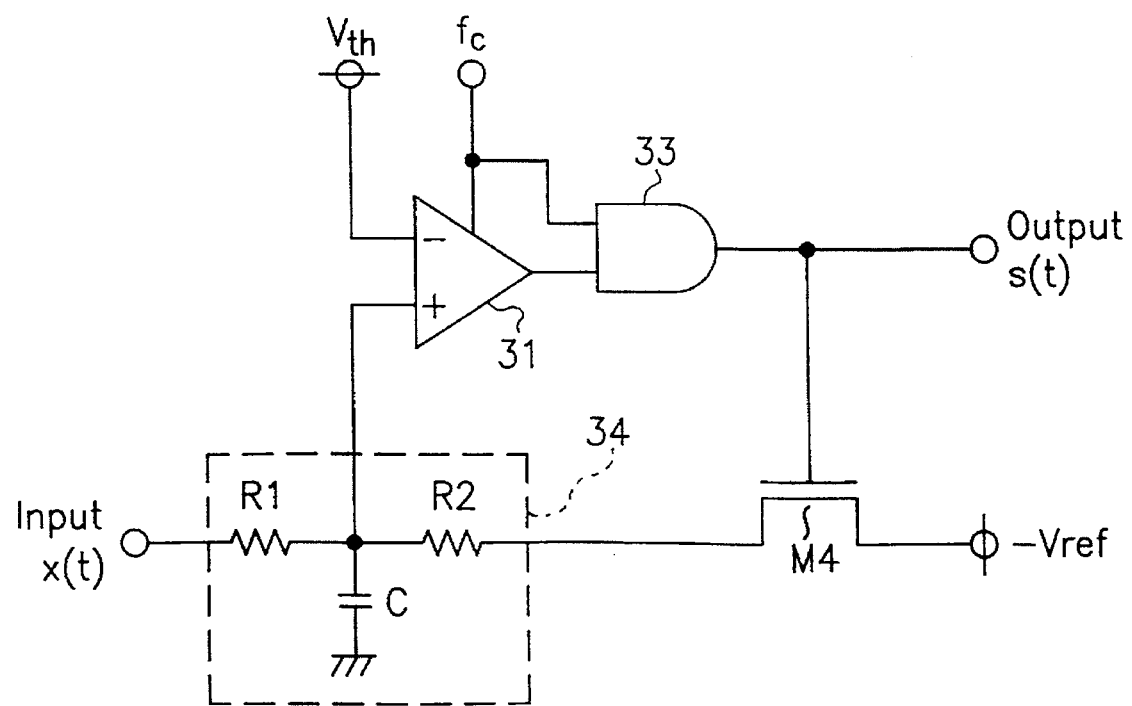
FIG. 5 is a circuit diagram of an axon hillock circuit section in which the noise feedback pulse coding shown in FIG. 4 is embodied.

FIG. 5 shows a continuous mode axon hillock circuit section based on equation (10). This axon hillock circuit section of FIG. 5 is identical in another structure to the axon hillock circuit section 30 shown in FIG. 3, and hence identical parts are denoted by the same reference numerals to omit redundant description.

In detail, the axon hillock circuit section of FIG. 5 has the same construction as that of FIG. 3 except that an RC integrator 34 is supplanted with the random wave generator 32, an MOS transistor M4 is connected between a feedback terminal of the RC integrator 34 and the output terminal of the AND gate 33, and an input terminal of the RC integrator 34 is connected to the output of the neuron body circuit section 20 of FIG. 3. Two resistors R1, R2 connected in series to each other and a capacitor C connected between a junction point of the two resistors and a ground constitutes an RC network serving as the integrator. Also, in the axon hillock circuit section of FIG. 5 the comparator 31 has two input terminals, one of which is a non-inverting terminal which receives a threshold voltage of the comparator 31, and the other of which is an inverting terminal to be connected to the junction point of the two resistors. In particular, to the other terminal of the resistor R1 the output $x_i(t)$ of the neuron body circuit section 20.

As shown in FIG. 5, the difference between the input signal x(t) and the output pulse sequence s(t) is integrated via the integrator 34 as the RC network. The integrated difference signal is compared with the threshold voltage $V_{th}$ of the comparator 31, and its output is latched. The clocked output of the comparator 31 latched thus is applied to a gate of the transistor M4 serving as a reference voltage switch, which feeds back the reference voltage $+V_{ref}$ or $-V_{ref}$ to the feedback terminal of the integrator 34. The integrator 34 integrates the voltage difference $x(t)-V_{th}$ the voltage sum $x(t)+V_{ref}$. Through this negative feedback operation, the integrated difference signal is kept close to the threshold voltage $V_{th}$ of the comparator 31, unless the input signal amplitude is very large. Within this limit, the output pulse density is proportional to the amplitude of the input signal. Thus, the output pulses carry the information of the input signal amplitude.

Figure 6:
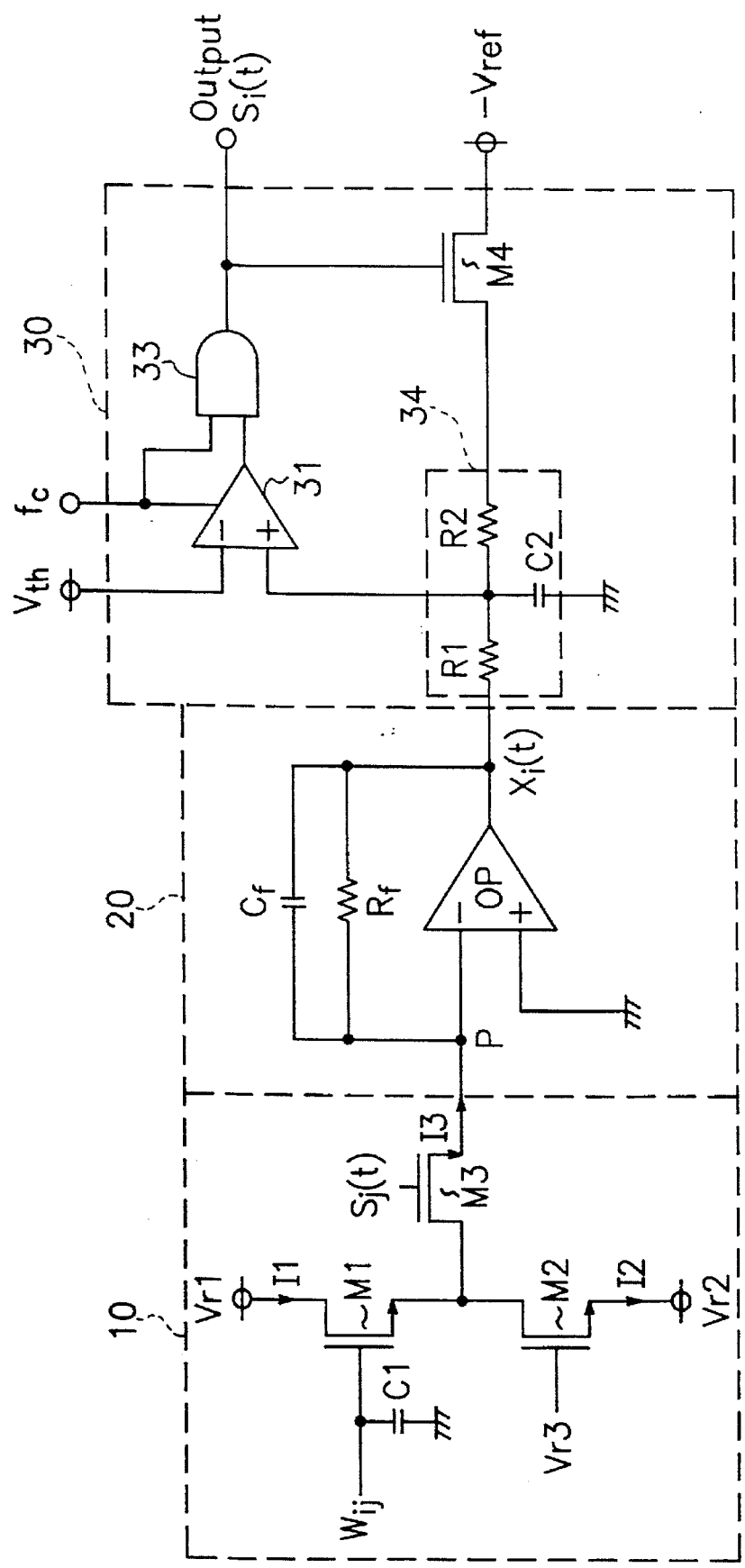
FIG. 6 is a circuit diagram of an artificial neural circuit according to another embodiment of the present invention.

FIG. 6 is a circuit diagram of an artificial neural circuit in which the axon hillock circuit section of FIG. 5 is embodied in accordance with another embodiment of the present invention. The artificial neural circuit of FIG. 6 has the same construction as that of FIG. 2 except the axon hillock circuit section of FIG. 5. Component elements having similar functions to the component elements of the circuit of FIG. 2 are indicated by the same reference numerals, and descriptions thereof are omitted.

In the artificial neural circuit using the axon hillock circuit section 30 of FIG. 5, the sigmoidal function is obtained by nonlinear characteristics of the neuron body circuit section 20 and coding characteristics of the axon hillock circuit section 30. The resistors R1, R2 used in FIG. 5 may be implemented by switched capacitors or linear resistors using MOS transistor. Storage of the weight value can be implemented by a capacitor using dynamic refresh or analog memory.

Figure 7:
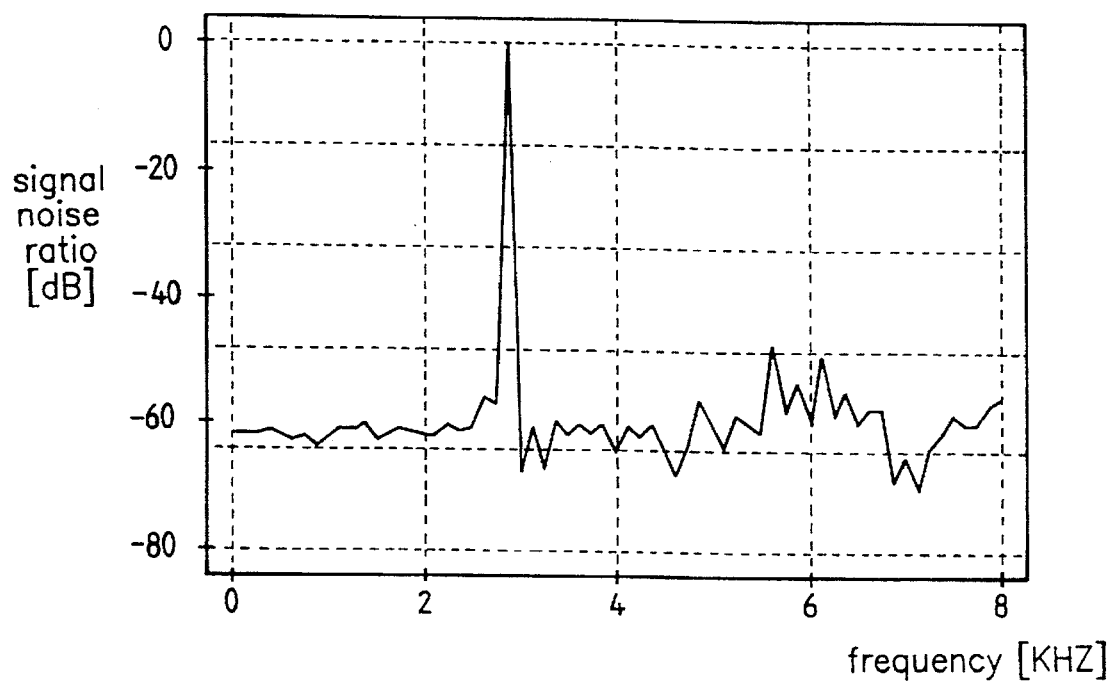
FIG. 7 is a diagram showing waveforms of a pulse train signal to be supplied from the output terminal of the axon hillock circuit section showing FIG. 6, when a testing sinusoid signal is applied to the input terminal of the axon hillock circuit section.

In order to test the function of the axon hillock circuit section of FIG. 6, it is set that conditions is the same conditions to the case of FIG. 3(i). Under these conditions, the resulting SNR, as shown in FIG. 7, is 45 dB. Consequently, the maximum number of axon hillock circuit sections using a stochastic pulse coding requires a length of 215 pulses so as to obtain a coding pulse sequence having an SNR of 45 dB.

However, the axon hillock circuit section using an NFPC requires $2^6$ pulses in maximum length. For example, when the same maximum pulse frequency is used, the NFPC is 512 times faster than the SPC in computation of weighted summation and communication.

In addition, the artificial neural circuit according to the present invention can be embodied as a unit element in several types of neural network systems.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An artificial neural circuit in which an operating principal of a biological neuron is embodied, said circuit comprising:

a synapse circuit section for producing and absorbing a current signal proportional to a weight voltage signal upon an externally applied current signal being supplied;

said synapse circuit section including a first input terminal for receiving a first reference voltage; a second input terminal for receiving a second reference voltage; a third input terminal for receiving a third reference voltage; a fourth input terminal for receiving the weight voltage signal; a first transistor having drain and source connected to the first reference voltage and a junction point, respectively, and gate connected to the fourth input terminal; a second transistor having drain and source connected to the junction point and the second input terminal, respectively, and gate connected to the third input terminal; and a third transistor having drain and source connected respectively to the junction point and an output terminal of the synapse circuit section, and gate connected to an input terminal for receiving the externally applied current signal;

a neuron body circuit section for spacio-temporally integrating output signal of the synapse circuit section to produce an analog voltage signal; and an axon hillock circuit for converting the analog voltage signal into a pulse train using a predetermined reference signal.

2. The artificial neural circuit according to claim 1, wherein said axon hillock circuit comprises a random wave generator for generating the predetermined reference signal, a first comparator for comparing the predetermined reference signal with an output signal of the neuron body circuit section, and an AND gate for receiving an output signal of the first comparator and a predetermined frequency signal, so as to generate the pulse train having one half of duty ratio of the output signal of the first comparator.

3. The artificial neural circuit according to claim 1, wherein said axon hillock circuit section comprises integrating means for integrating the output signal of the neuron body circuit section to produce an integrated signal, a second comparator for comparing the integrated signal with a threshold signal to produce a resulting signal, duty converting means for generating an output signal having one half of duty ratio of the resulting signal of the second comparator, and feedback means in response to the output signal of the duty converting means to supply a reference signal for the integrating means.

4. The artificial neural circuit according to claim 1, wherein said neuron body circuit section comprises an operational amplifier having an inverting terminal connected with the source of the second transistor and a non-inverting terminal connected with a ground, a capacitor connected between the inverting terminal and an output terminal of the operational amplifier, and a resistor connected in parallel to the capacitor, so that integration time of the neuron body circuit section is controlled dependent upon time constant of the capacitor and resistor.

* * * * *